Feb. 17, 1959  N. H. CURTISS  2,873,844
ELEVATOR CONVEYOR BELT, BUCKET AND ATTACHING MEANS
Filed March 29, 1956
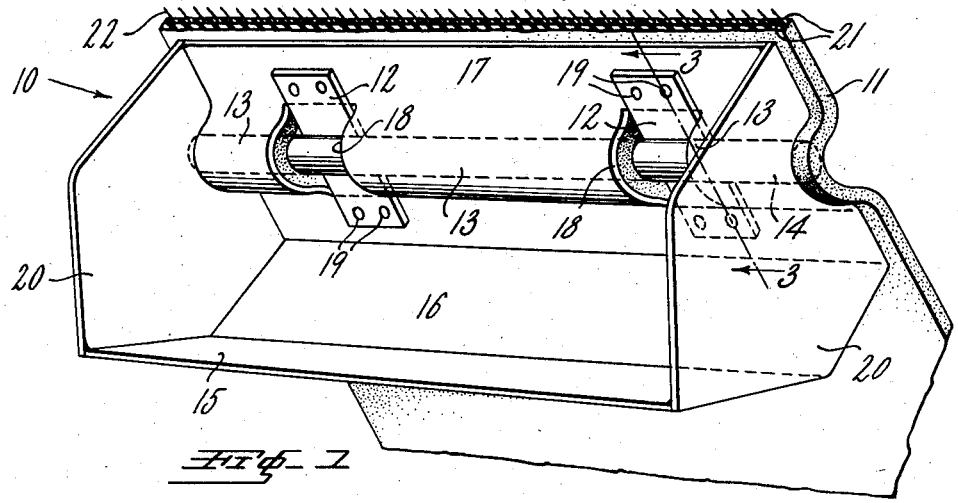
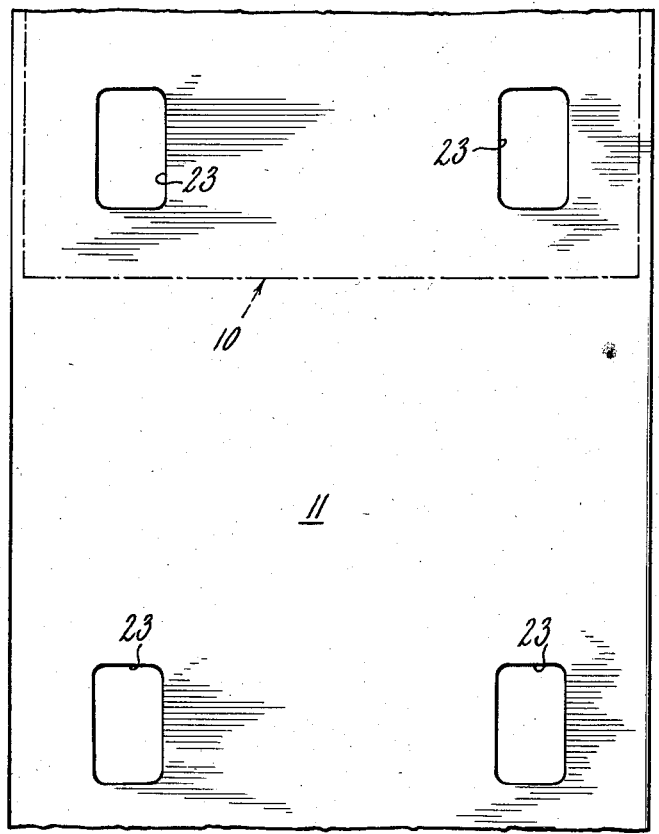
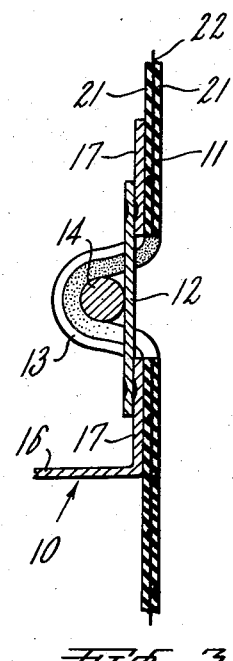
INVENTOR.
NATHANIEL H. CURTISS
BY
*Robert C. Weber*
ATTORNEY

United States Patent Office 2,873,844
Patented Feb. 17, 1959

2,873,844

ELEVATOR CONVEYOR BELT, BUCKET AND ATTACHING MEANS

Nathaniel H. Curtiss, Clifton, N. J., assignor to United States Rubber Company, New York, N. Y., a corporation of New Jersey Application March 29, 1956, Serial No. 574,837

7 Claims. (Cl. 198—151)

This invention relates to elevators and more particularly to endless conveyor belt type grain elevators, and it contemplates improvements in the elevator bucket, belt, attaching means and in the combination thereof.

In the prior art, it is customary to secure the buckets and belts of such grain elevators by means of bolts or rivets passing through both the bucket and the belt. This construction has a number of disadvantages, one of which is that the applied tensile stress on the belt is concentrated over the relatively small areas of attachment, eventually causing the belt to fail in these areas and thereby permitting the bolts or rivets to tear out. Another disadvantage is that the assembly and disassembly of the belt and bucket requires the use of special tools and a considerable amount of time.

Accordingly, it is an object of the invention to provide an improved combination of bucket, belt and attaching means therefor, so constructed and arranged that (1) the applied stress is evenly distributed over the belt for increased belt life; (2) the use of bolts, rivets or similar fastening means is completely eliminated; (3) the bucket, belt and attaching means may be easily and quickly assembled and disassembled without tools of any kind, but are effectively held together by means of friction when the belt is placed under tension; (4) the bucket and attaching means are shielded by the belt from interfering with the elevator housing and pulleys, and (5) the belt is shielded by the bucket from contact with the material being carried.

It is another object of the invention to provide an improved bucket so constructed and arranged that it (1) forms part of the attaching means; (2) provides a concave seat for the belt; (3) prevents the belt from ripping or tearing, and (4) effectively shields the belt from contact with the material being carried.

It is a further object of the invention to provide an improved belt so constructed and arranged that it (1) is sufficiently flexible to readily conform to the concave portion of said bucket without being undesirably distorted by the portion of the attaching means formed in the bucket; (2) is strong enough to carry the applied load without undue elongation, and (3) acts as a shield to prevent the bucket and attaching means from interfering with the elevator housing and pulleys.

It is a still further object of the invention to provide an improved attaching means so constructed and arranged that it is (1) partially formed in the bucket itself while the other part thereof is mobile for ready assembly and disassembly of the bucket and belt without tools of any kind, and (2) completely eliminates the use of bolts, rivets or similar fastening means.

Other objects and advantages of the invention will become apparent upon consideration of the following specification and claims when read in conjunction with the accompanying drawing wherein:

Fig. 1 is a partial, perspective view illustrating the bucket, belt and attaching means as assembled;

Fig. 2 is a partial plan view of the belt, illustrating the positioning of the belt and the bucket, the latter being shown in phantom, and Fig. 3 is a partial, sectional view taken on line 3—3 of Fig. 1.

Referring to the drawing, Fig. 1 shows the assembly of the bucket 10, belt 11 and attaching means comprising the plates 12 and concave portion 13 formed in the bucket 10, as well as the cylindrical stay rod 14. This particular embodiment of the invention is peculiarly adapted to a conventional, multiple bucket type, continuous belt elevator (not shown) for moving bulk material such as grain, from a lower level to a higher level.

While the bucket 10 may be made in any desired manner, it is preferably formed as follows: The front wall 15, the bottom wall 16 and rear wall 17 are formed in a press by dies from a metal sheet. Preferably, the concave portion 13 of rear wall 17 is formed, and the spaced slots 18 therein are punched out at the same time. The metal plates 12 traversing the concave portion 13, are cut to the proper size and shape and are then spot welded, at a plurality of points 19, to the rear wall 17, to bridge slots 18. By forming part of the attaching means in the bucket itself, not only are bolts and rivets eliminated and a stronger attachment made, but also the assembly and disassembly of bucket 10 and belt 11 is greatly facilitated, as will be pointed out below. It will further be noted that the plates 12 are welded to the inside of rear wall 17 so that the belt 11 fits flush thereagainst and to avoid any projections on rear wall 17, which might rip or tear the belt 11. Moreover, as will be apparent, the concave portion 13 not only provides a smooth seat for belt 11, but also shields the latter from abrasion by the material carried in the bucket 10. Next, the bucket side walls 20 are punched out of sheet metal to the proper size and shape and are welded to the ends of walls 15, 16 and 17 to complete the bucket 10.

As seen in Figs. 1 and 3, the belt 11 comprises outer layers 21 of elastomeric material, such as natural or synthetic rubber, and one or more inner layers 22 of fibrous reinforcement. While square woven fibrous materials such as "duck" may be used for layer(s) 22, it is preferred that a fibrous, corded material be employed therefor, the individual cords running longitudinally of the travel of the belt to give the desired combination of maximum strength with maximum flexibility. As a result, the belt 11 will be strong enough to carry the applied load without undue elongation, but will also be sufficiently flexible to fit snugly within and conform closely to the concave portion 13 of the bucket rear wall 17.

When cut to width, as shown in Fig. 2, the belt 11 is made slightly wider than the bucket 10, shown in phantom, so that the latter is shielded by the belt from interfering with the elevator housing and pulleys (not shown). In addition, it is preferred that spaced slots 23 be cut out of the belt to permit the adjacent, unslotted portion thereof to closely conform with the concave portion 13 in the bucket 10. In order to accomplish this, the slots 23 are of such a size and shape that they are substantially coextensive with slots 18 in concave portion 13, and are so spaced that they are in substantial alignment with plates 12 to prevent the latter from interfering with the extension of the adjacent, unslotted portion of belt 11 into concave portion 13, as shown in Figs. 1 and 3.

To complete the attachment of the bucket 10 to the belt 11, the substantially cylindrical, metal stay rod 14 is inserted between the belt 11 and the plates 12, as also shown in Figs. 1 and 3. This insertion is quickly and easily accomplished by hand in contrast to the longer time, more labor, and special tools required in employing conventional bolts or rivets to attach the buckets to the belt. Likewise, the rod 14 may be readily removed to disassemble bucket 10 and belt 11, as opposed to the aforesaid prior art constructions. This stay rod 14, which extends into the concave portion 13 and is substantially coextensive therewith, securely attaches the bucket 10 to the belt 11, in cooperation with the concave portion 13 and plates 12, by friction. Moreover, this frictional attachment is made more secure during operation because the tension on the belt 11, which tension is evenly distributed substantially over the entire width of the belt along concave portion 13 and rod 14, insures firm engagement between plates 12 and rod 14. As with the bucket 10, the belt 11 overlaps rod 14 at each end to shield the latter from snagging on the elevator housing or pulleys (not shown).

As will now be apparent, the above described invention has a number of advantages, chief among which are the following. The applied tensile stress on the belt 11 in operation is evenly distributed substantially over the entire width of the belt for longer belt life, rather than being concentrated over relatively small areas, as in prior art construction wherein bolts or rivets passing through holes in the belt are used to attach the buckets thereto. The use of such bolts, rivets or similar fastening means is completely eliminated by the inventive construction, thereby reducing costs and facilitating assembly and disassembly of the bucket and the belt. At the same time, the attachment between the bucket and the belt is made stronger by being at least partially formed within the bucket itself; the belt is designed to overlap the bucket and rod to keep the latter from interfering with the elevator structure (not shown), and the integral concave portion of the bucket not only provides an adequate seat for the belt to facilitate the attachment thereof, but also shields the belt from abrasion by the material being carried in the bucket.

While the invention has been described and illustrated with reference to specific embodiments thereof, it will be understood that various changes may be made therein by those skilled in the art, without departing from the scope of the invention, as defined in the appended claims. For example, the plates 12 could readily be made integral with rear wall 17 of bucket 10, and the belt 11 could readily be provided with spaced pairs of longitudinally extending slits corresponding to the side walls of slots 23, rather than having the complete slots 23 cut therein, if desired.

Having thus described my invention, what I claim and desire to protect by Letters Patent is:

1. In an elevator of the class described, the combination of a bucket having a member provided with a concave portion and means extending transversely of said concave portion, a flexible belt extending into said concave portion and having spaced openings in substantial alignment with said transversely extending means, and means extending between said belt and said transversely extending means for attaching said bucket to said belt in cooperation with said concave portion and said transversely extending means.

2. In an elevator of the class described, the combination of a bucket having a member provided with a concave portion, spaced openings in said concave portion and means extending transversely of said concave portion to bridge said openings, a flexible belt extending into said concave portion and having spaced openings substantially coextensive with said openings in said concave portion and in substantial alignment with said transversely extending means, and means extending between said belt and said transversely extending means for attaching said bucket to said belt in cooperation with said concave portion and said transversely extending means.

3. In an elevator of the class described, the combination of a bucket having a wall provided with a concave portion and plates extending transversely of said concave portion, a flexible belt extending into said concave portion and having spaced slots in substantial alignment with said plates, and a stay rod extending into said concave portion between said belt and said plates for frictionally attaching said bucket to said belt in cooperation with said concave portion and said plates.

4. In an elevator of the class described, the combination of a bucket having a rear wall provided with a concave portion, spaced slots in said concave portion and plates extending transversely of said concave portion to bridge said slots, a flexible belt extending into said concave portion and overlapping said rear wall at each end, said belt having spaced slots substantially coextensive with said slots in said concave portion and in substantial alignment with said plates, and a stay rod substantially coextensive with and extending into said concave portion between said belt and said plates for frictionally attaching said bucket to said belt in cooperation with said concave portion and said plates.

5. In an elevator of the class described, a bucket having a member provided with a concave portion for receiving a belt, spaced openings in said concave portion and means extending transversely of said concave portion to bridge said openings for receiving means adapted to attach said bucket to said belt in cooperation with said concave portion and said transversely extending means.

6. In an elevator of the class described, a bucket having a wall provided with a concave portion for receiving a belt and plates extending transversely of said concave portion for receiving a stay bolt adapted to attach said bucket to said belt in cooperation with said concave portion and said plates.

7. In an elevator of the class described, a bucket having a rear wall provided with a concave portion for receiving a belt, spaced slots in said concave portion and plates extending transversely of said concave portion to bridge said slots for receiving a stay bolt adapted to attach said bucket to said belt in cooperation with said concave portion and said plates.

References Cited in the file of this patent
UNITED STATES PATENTS
872,855     Shook                Dec. 3, 1907